Dec. 31, 1968
M. G. HUNTINGTON
3,419,144
METHOD OF NON-CYCLIC FILTRATION UTILIZING BOUNDARY LAYER HEAT TRANSFER
Filed April 25, 1967
FIG.1 - PRIOR ART -
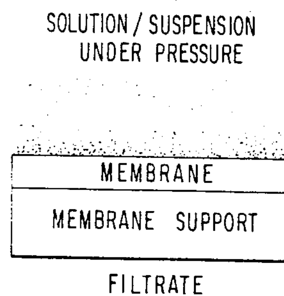
FIG.2
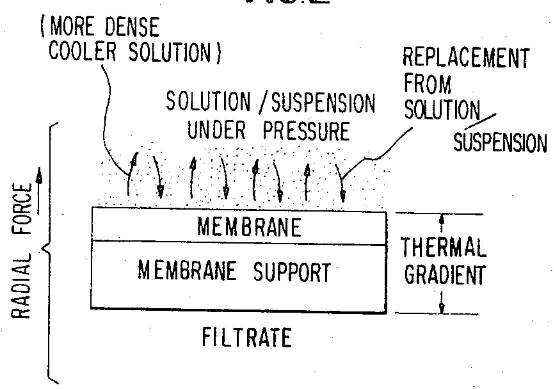
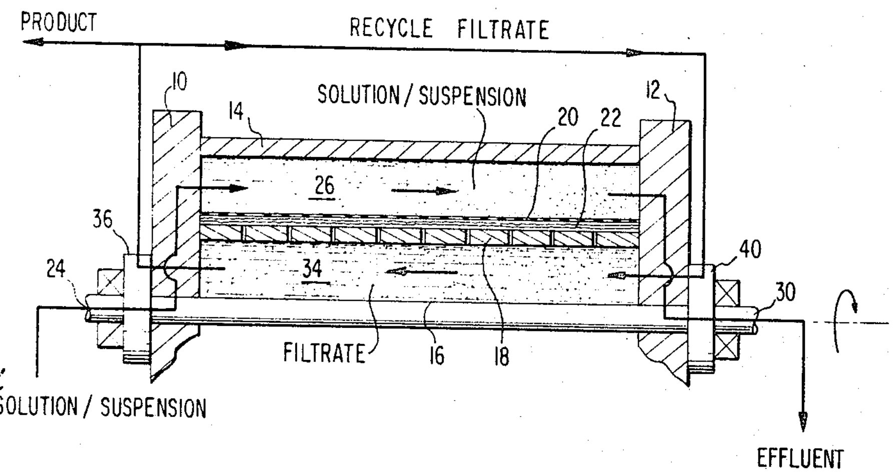
FIG.3
*INVENTOR*
MORGAN G. HUNTINGTON
BY Sughrue, Rothwell, Mion, Zinn & Macpeak
ATTORNEYS United States Patent Office 3,419,144
Patented Dec. 31, 1968

3,419,144
METHOD OF NON-CYCLIC FILTRATION UTILIZING BOUNDARY LAYER HEAT TRANSFER
Morgan G. Huntington, Box 81, Woodfield Road, Galesville, Md. 20765
Filed Apr. 25, 1967, Ser. No. 633,593
9 Claims. (Cl. 210—78)

ABSTRACT OF THE DISCLOSURE

A method of non-cyclic pressurized filtration which utilizes heat transfer across a membrane and combined centrifugal force to cause radial convective forces in solution/suspension at a boundary layer on the membrane surface and thereby prevent a concentration in the boundary layer allowing more rapid and efficient filtration through the membrane. Heat transfer is accomplished by recycling filtrate at a temperature different from the solution/suspension and in countercurrent flow. Radial acceleration is applied by rotating an assembly containing the membrane, filtrate and solution/suspension.

This invention relates to improvements in non-cyclic pressurized filtration in inward or outward flowing centrifugal apparatus. More specifically, the invention further provides for convective mixing of radially accelerated, pressurized solutions and/or suspensions which are being concentrated by partially filtering out the solvent and/or the suspending fluid vehicle by changing the temperature and density of the fluid layer against the filter medium as a result of conducting heat through the filter medium and its support, and maintaining a temperature differential by countercurrent flow of recycled filtrate and solution/suspension on opposite sides of a filter medium.

The continuous filtration of fluids and the sizing of very fine suspensions (viz., separation of viruses from bacteria) through membrane-filters of small pore diameter has heretofore been practically impossible because the rapid formation of a filter cake was unavoidable. This invention provides a dependable and positive means of preventing the coating of particulate matter upon a filter medium and thus to maintain uniform permeability through creating an autogenous backwash by means of thermally induced radial convection, beginning beneath any impinging dispersoid.

As is known, the separation of a solvent from a solution can be effected by pressure filtration through certain types of solute-retarding membranes. However, such separation of solvent and the resulting concentration of solute in the solution sharply restricts the rate of separation because the solute that is removed from the expelled solvent must inevitably concentrate within the membrane surface fluid layer. Such boundary layer concentration of solute is conventionally relieved by increased diffusion of solute through the membrane, thus recontaminating the separated solvent. Diffusion back into the concentrating bulk solution, because of the lesser difference in concentration of solute, is a somewhat slower process. This invention continuously changes the membrane boundary layer of the solution/suspension by a thermally induced radial convective force, thereby causing the concentration of solute within the boundary layer to approach that of the bulk solution and thus remove the inherent rate limit of membrane pressure filtration processes.

The method of this invention may utilize concentric drum apparatus mounting a filter medium upon a perforated inner drum within which filtrate is recycled, the recycled filtrate being cooler than the solution/suspension being concentrated. However, the recycled filtrate may be warmed to a temperature higher than that of the solution/suspension so that the boundary layer becomes less dense than the bulk fluid. In this latter case the membrane would be mounted inside of the perforated outer drum in order that the warmer and lighter boundary layer is radially outside of the fluid subject to concentration and to radial convective mixing.

The effects achieved by the present invention are not modified by vehicular fluid viscosity, which ultimately limits the performance of conventional separating centrifuges. Furthermore, it is emphasized that the homogeneity of the solution/suspension is achieved by radial convective mixing induced by change in boundary layer density resulting from thermal transfer through the filter medium.

Radial turbulence within the pressurized solution as provided in the present invention is by no means comparable with high velocity unidirectional longitudinal solution flow in respect to erosive and abrasive effect upon the delicate, ion-retarding surface of the membrane. Because no unbalanced radial force can exist, no matter what the radial acceleration, without a change in density of some part of the pressurized solution, the erosion of the membrane surface is negligible. Moreover, any difference in mass or bulk density brought about, for example, by heat transfer through an externally mounted membrane from solution to recycled product, results in a radial force which instantly produces a non-violent convective adjustment within the pressurized solution. Thus, the membrane surface is kept clear of particulate matter and marked solute concentration within the boundary layer becomes impossible, all without high velocity erosive currents which seriously abrade the membrane surface.

Other features of this invention will be pointed out in the following detailed description and claims and illustrated in the accompanying drawings which disclose, by way of examples, the principle of this invention and the best modes which have been contemplated for applying that principle.

In the drawings:

FIG. 1 is a schematic illustration of prior art showing a filter medium for pressurized filtration with a solution/suspension on one side and the filtrate on the other side;

FIG. 2 is a schematic illustration of this invention; and

FIG. 3 is a schematic view of an apparatus for practicing the process of this invention.

In the prior art arrangement of FIG. 1, even with the membrane moving, solute and particulate matter will concentrate at the boundary layer on the surface of the membrane, slowing down and finally stopping the flow of filtrate through the membrane.

In this invention a thermal gradient is provided across the membrane between the filtrate and solution/suspension, and the entire assembly is subjected to centrifugal forces. By virtue of this thermal gradient and radial acceleration, convective forces will appear within the solution/suspension. The convective forces caused by the less dense and cooler layer of solution/suspension will start at the surface of the membrane and prevent any solute or particulate material from concentrating in a boundary layer on the surface of the membrane. That is, there will be an autogenous backwash due to thermal convection causing the solution/suspension at the surface of the membrane to move away from the surface and allow other portions of the bulk solution/suspension to replace it in the boundary layer. In its movement away from the surface the solution will carry the solute or particulate material in suspension with it, mixing it again in the bulk solution.

Perhaps this is an over-simplified explanation but acual tests on an operating device utilizing a thermal gradient have shown the operability and unexpected results in an arrangement of this type wherein the solution/suspension, membrane and filtrate are all radially accelerated as a unit and the solution/suspension and filtrate are passed through the unit.

In FIG. 3 there is shown an apparatus for radially accelerating the filtrate and solution/suspension as a unit on both sides of a membrane. The apparatus includes end plates 10 and 12 and outer shell 14 rotated on a central shaft 16. A membrane support 18 may be provided with liquid passage means, e.g., perforations, and membrane 20 may be placed on top of a laterally permeable membrane underliner 22. Of course the membrane support itself could be laterally permeable to accomplish the same results. In the embodiment illustrated with the membrane on the outside of the membrane support, pressurized solution/suspension enters the center of shaft through inlet 24, passes through end plate 10 and moves through annular space 26 while the entire apparatus is rotated on shaft 16. The solution/suspension passes out the other end plate 12 and exits as effluent through outlet 30.

The filtrate will be below the membrane support 18 in space 34 and may pass out through the end plate 10 and gland 36. In order to provide the thermal gradient in this illustrated embodiment, the filtrate may be partially taken off as product but mostly recycled through gland 40 to flow through space 34 in countercurrent relationship to the flow of the solution/suspension in space 26. The temperature of the recycled filtrate will be different to provide the thermal gradient across the membrane, for example the filtrate with the recycled material will be cooler than the solution/suspension. With this cooler filtrate, and a thermal gradient across the membrane, the more dense layer of concentrated solution/suspension on the surface of the membrane will cause an autogenously induced backwash at the solution/suspension surface of the membrane to prevent concentration in the boundary layer.

When cooling the filtrate as in the presently illustrated embodiment, the cooler filtrate must be radially inboard from the accelerated bulk solution. In this matter, the part of the bulk solution/suspension which is at the boundary layer is cooler and, therefore, more dense and this causes it to move outwardly under the radial acceleration applied to it, whereas the other portion of the bulk solution which is not as dense will tend to take its place in the boundary layer, thus breaking up any concentration in the boundary layer. Obviously the reverse of the above arrangement could also be used with the membrane on the inside of the membrane support.

As can be seen, there are several variables or parameters of this process. However, the desired result is to obtain a convection force adjacent the membrane, which force is equal to a change in mass of the solution/suspension times acceleration. A change in mass is due to the change in density which in turn is dependent upon the temperature differential across the membrane, the rate of solution/suspension and filtrate movement relative to each other and the pressure applied to the solution/suspension which affects the rate of filtration. The acceleration, of course, is directly related to the rate at which the apparatus is rotated and the number of G's applied by such rotation. With these principles one skilled in the art can choose suitable parameters depending upon the capacity desired and the material being filtered.

While the invention has been particularly shown and described with reference to a preferred embodiment thereof, it will be understood by those skilled in the art that various changes in form and details may be made therein without departing from the spirit and scope of the invention.

What is claimed is:

1. A method of non-cyclic pressurized filtration which utilizes heat transfer through a membrane and support therefor in order to prevent concentration of solution/suspension in a boundary layer on a filter membrane, the method comprising:

(a) passing a pressurized solution/suspension along one side of a filter membrane, (b) collecting and passing a filtrate along the other side of the membrane, (c) applying radial forces to the solution/suspension, membrane and filtrate together as a unit, and (d) providing a temperature differential and conducting heat across the membrane and consequently changing the bulk density of a boundary layer on the solution/suspension side of the membrane so that concentration of the boundary layer will be prevented by thermally induced radial convection in the solution/suspension.

2. A method as defined in claim 1 wherein the solution/suspension and filtrate are passed countercurrent relative to one another on opposite sides of the membrane while applying radial forces.

3. A method as defined in claim 1 wherein the radial forces are applied by rotating the solution/suspension, membrane and filtrate together as a unit.

4. A method as in claim 1 wherein the temperature differential is provided by filtrate cooler than the solution/suspension.

5. A method as in claim 4 wherein the filtrate is cooled by utilizing recycled filtrate mixed with collected filtrate.

6. A method as in claim 1 wherein the providing of the temperature differential is accomplished by heating the solution/suspension.

7. A method as in claim 1 wherein the temperature differential is provided by heating recycled filtrate mixed with the collected filtrate.

8. A method as defined in claim 1 wherein providing the temperature differential is accomplished by cooling the solution.

9. A method as in claim 1 wherein the filtrate and solution/suspension are continuously introduced and withdrawn and flow countercurrent to each other on opposite sides of the membrane.

References Cited

UNITED STATES PATENTS 2,772,782 12/1956 Jansma ---------- 210—176 X
3,355,382 11/1967 Huntington ---------- 210—22

REUBEN FRIEDMAN, *Primary Examiner.*

J. DE CESARE, *Assistant Examiner.*

U.S. Cl. X.R.

210—321, 380